US009346245B2

(12) United States Patent
Wu et al.

(10) Patent No.: US 9,346,245 B2
(45) Date of Patent: May 24, 2016

(54) LAMINAR COMPOSITE TOILET LID AND SEAT

(75) Inventors: Chengdong Wu, Allen, TX (US); Jie Zhang, Allen, TX (US)

(73) Assignee: Topseat International, Inc., Plano, TX (US)

( * ) Notice: Subject to any disclaimer, the term of this patent is extended or adjusted under 35 U.S.C. 154(b) by 987 days.

(21) Appl. No.: 13/083,161

(22) Filed: Apr. 8, 2011

(65) Prior Publication Data

US 2012/0255106 A1 Oct. 11, 2012

(51) Int. Cl.
 *A47K 13/14* (2006.01)
 *B32B 21/02* (2006.01)
 *A47K 13/02* (2006.01)
 *B32B 27/30* (2006.01)

(52) U.S. Cl.
 CPC ............ *B32B 21/02* (2013.01); *A47K 13/02* (2013.01); *B32B 27/308* (2013.01); *B32B 2307/412* (2013.01); *B32B 2317/12* (2013.01); *B32B 2317/16* (2013.01); *B32B 2333/12* (2013.01); *B32B 2509/00* (2013.01); *Y10T 428/24802* (2015.01)

(58) Field of Classification Search
 CPC .............................. A47K 13/24; A47K 13/02
 USPC .................... 4/242.1, 234, 237, 661
 See application file for complete search history.

(56) References Cited

U.S. PATENT DOCUMENTS

| | | | |
|---|---|---|---|
| 1,829,526 A * | 10/1931 | Leslie | 427/210 |
| 2,771,612 A | 11/1956 | Samuels | |
| 3,484,876 A * | 12/1969 | Thomas | 4/234 |
| 3,863,277 A | 2/1975 | Harrison | |
| 4,115,127 A | 9/1978 | Ikeda et al. | |
| 4,318,213 A | 3/1982 | Blount | |
| 5,457,515 A | 10/1995 | Quadracci et al. | |
| 5,829,073 A * | 11/1998 | Lee | 4/661 |
| 5,896,230 A | 4/1999 | Goggins | |
| 6,640,349 B2 | 11/2003 | Toldo et al. | |
| 2005/0076424 A1* | 4/2005 | Mattingly | 4/242.1 |
| 2007/0298229 A1* | 12/2007 | Rasmusson et al. | 428/212 |
| 2008/0008885 A1 | 1/2008 | Terfloth et al. | |

(Continued)

FOREIGN PATENT DOCUMENTS

| | | |
|---|---|---|
| CN | 101664289 A | 3/2010 |
| GB | 422797 A | 1/1935 |

(Continued)

OTHER PUBLICATIONS

Notification of transmittal of the International Search Report and the Written Opinion of the International Searching Authority dated Jan. 25, 2013 in connection with International Patent Application No. PCT/US2012/025864.

(Continued)

*Primary Examiner* — Huyen Le

(57) ABSTRACT

Embodiments of the present disclosure include a laminate composite toilet lid and seat and a method of manufacturing thereof. The toilet lid includes a core structural layer having a shape and size associated with the toilet lid. The toilet lid also includes a first decorative graphic layer disposed on a first surface of the core structural layer. The toilet lid further includes a plurality of exterior layers disposed on exterior surfaces of the core structural layer and the first decorative graphic layer, the exterior layers configured to envelop the toilet lid.

20 Claims, 4 Drawing Sheets

(56) References Cited

U.S. PATENT DOCUMENTS

2009/0068453 A1* 3/2009 Chung .................... 428/337
2009/0155593 A1 6/2009 O'Brien et al.
2011/0146792 A1* 6/2011 Wu et al. .................. 136/259

FOREIGN PATENT DOCUMENTS

GB 2 021 176 A 11/1979
GB 2 380 444 A 4/2003
WO WO 2004/110743 A1 12/2004

OTHER PUBLICATIONS

Supplementary European Search Report dated Feb. 16, 2015 in connection with European Patent Application No. EP 12 76 7262.
Non-Final Office Action dated Jun. 17, 2015 in connection with U.S. Appl. No. 13/486,872; 7 pages.
Office Action dated Jan. 13, 2016 in connection with U.S. Appl. No. 14/065,155.
U.S. Office Action issued for U.S. Appl. No. 13/563,093 dated Mar. 11, 2016, 8 pgs.

* cited by examiner

LAMINAR COMPOSITE TOILET LID AND SEAT

TECHNICAL FIELD

This disclosure is generally directed to toilets and more particularly to a toilet lid and seat that are formed of a laminar composite material.

BACKGROUND

Toilet seats and lids have existed in various forms for many decades. A toilet seat; provides a surface for an occupant to comfortably sit and a toilet lid provides a protective cover for the toilet facility. Generally, toilet seats and lids are made of wood or plastic materials. These materials can degrade, discolor, and/or become damaged over time. Thus, many toilet seats and lids may become unattractive, structurally unsound, or both.

Additionally, most toilet seats and lids have plain, unadorned surfaces that do not include any type of decoration or permit any artistic expression. Some conventional toilet seats have surfaces that are adorned with silk-screen printing, hand painting, water-transfer printing, heat transfer printing, and the like. However, the surfaces of these seats, like plain toilet seats, can wear, chip off, degrade, or otherwise become damaged over time. There are also polyresin toilet seats that are made from resin compounds and are typically clear with optional decorative inserts. However, polyresin toilet seats are typically heavy and expensive to manufacture.

SUMMARY

According to one embodiment of the present disclosure, a composite laminar material includes a core structural layer. The composite laminar material also includes a first decorative graphic layer disposed on a first surface of the core structural layer. The composite laminar material further includes a plurality of exterior layers disposed on exterior surfaces of the core structural layer and the first decorative graphic layer.

In another embodiment, a toilet lid includes a core structural layer having a shape and size associated with the toilet lid. The toilet lid also includes a first decorative graphic layer disposed on a first surface of the core structural layer. The toilet lid further includes a plurality of exterior layers disposed on exterior surfaces of the core structural layer and the first decorative graphic layer, the exterior layers configured to envelop the toilet lid.

In still another embodiment a method of manufacturing a toilet lid includes preparing a core structural layer of the toilet lid. The method also includes applying a first decorative graphic layer to a first surface of the core structural layer. The method further includes applying a plurality of exterior layers to exterior surfaces of the core structural layer and the first decorative graphic layer.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a laminar composite toilet lid and seat configured to include decorative or aesthetic elements. The composite toilet lid and seat according to this disclosure offers many advantages. The toilet lid and seat may be customized with one or more images to convey a message or impression that may be of interest to a user. In addition, the toilet lid and seat according to this disclosure is constructed to be more durable and retain its original appearance for a longer period than conventional toilet lids and seats.

The laminar composite toilet lid and seat according to embodiments of this disclosure is constructed with five (5) layers of material: a core structural layer, two decorative graphic layers disposed on top and bottom surfaces of the core structural layer, and two exterior finish layers disposed on outside surfaces of the core structural layer and decorative graphic layers. All of the layers are integrated together to form a durable, attractive product.

Figure 1:
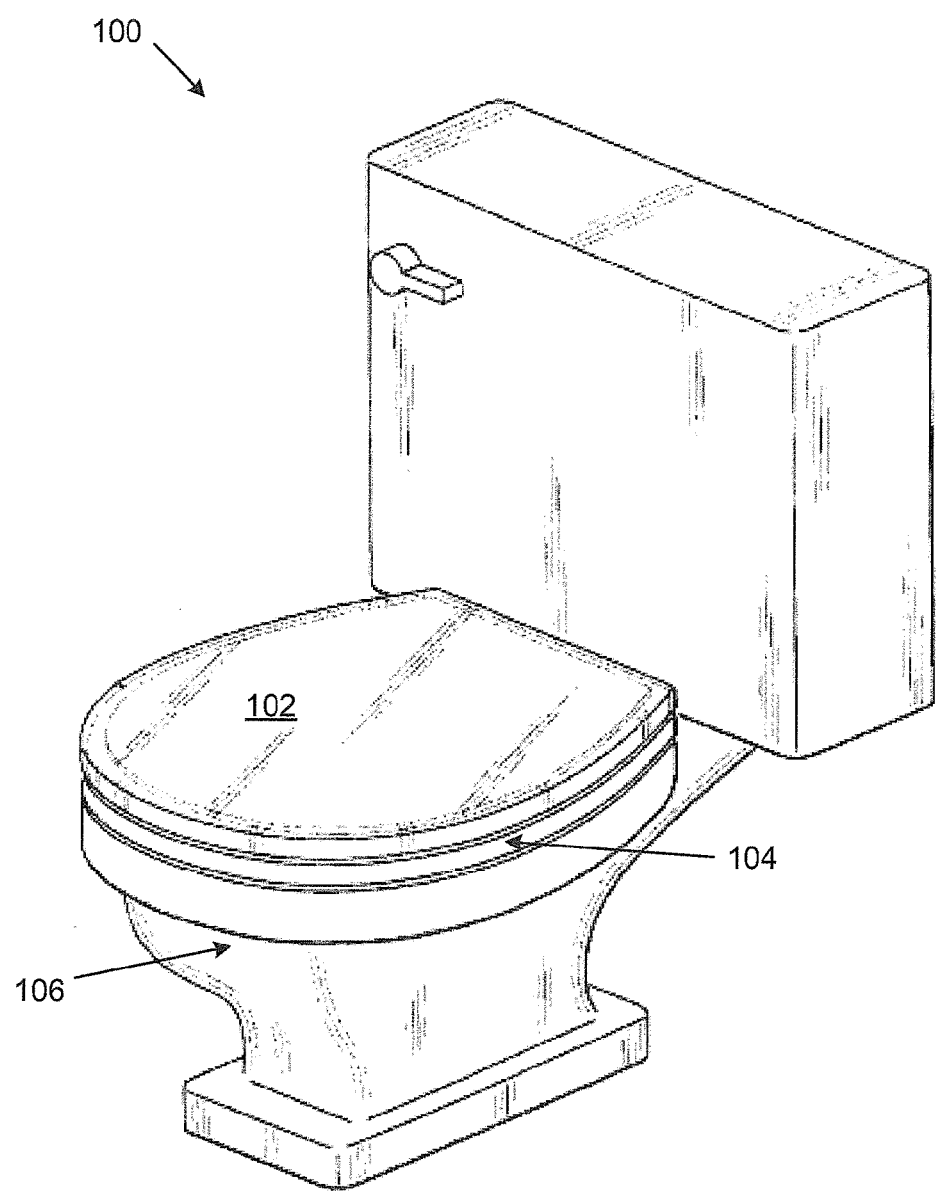
FIG. 1 illustrates a toilet with a laminar composite toilet lid and seat, according to one embodiment of the present disclosure.

FIG. 1 illustrates a toilet with a laminar composite toilet lid and seat, according to one embodiment of the present disclosure. The embodiment of the toilet shown in FIG. 1 is for illustration only. Other embodiments of the toilet could be used without departing from the scope of this disclosure.

As shown in FIG. 1, a toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have a size and shape configured to generally match the size and shape of the bowl 106 and to cover the opening of the bowl 106. The toilet lid 102 and toilet seat 104 attach to a rear portion of the bowl 106 or toilet 100 using hinged hardware that allow the toilet lid 102 and toilet seat 104 to raise and lower independently with respect to the bowl 106 and to each other, as is known in the art.

Although FIG. 1 depicts one example of a toilet 100 with a toilet lid 102 and toilet seat 104, various changes may be made to FIG. 1. For example, while the bowl 106 is depicted as generally round or oval in shape, the bowl 106 could include other shapes, such as a rectangle or octagon. Likewise, the toilet lid 102 and toilet seat 104 could also include other shapes in order to match, or be different from, the bowl 106.

Figure 2:
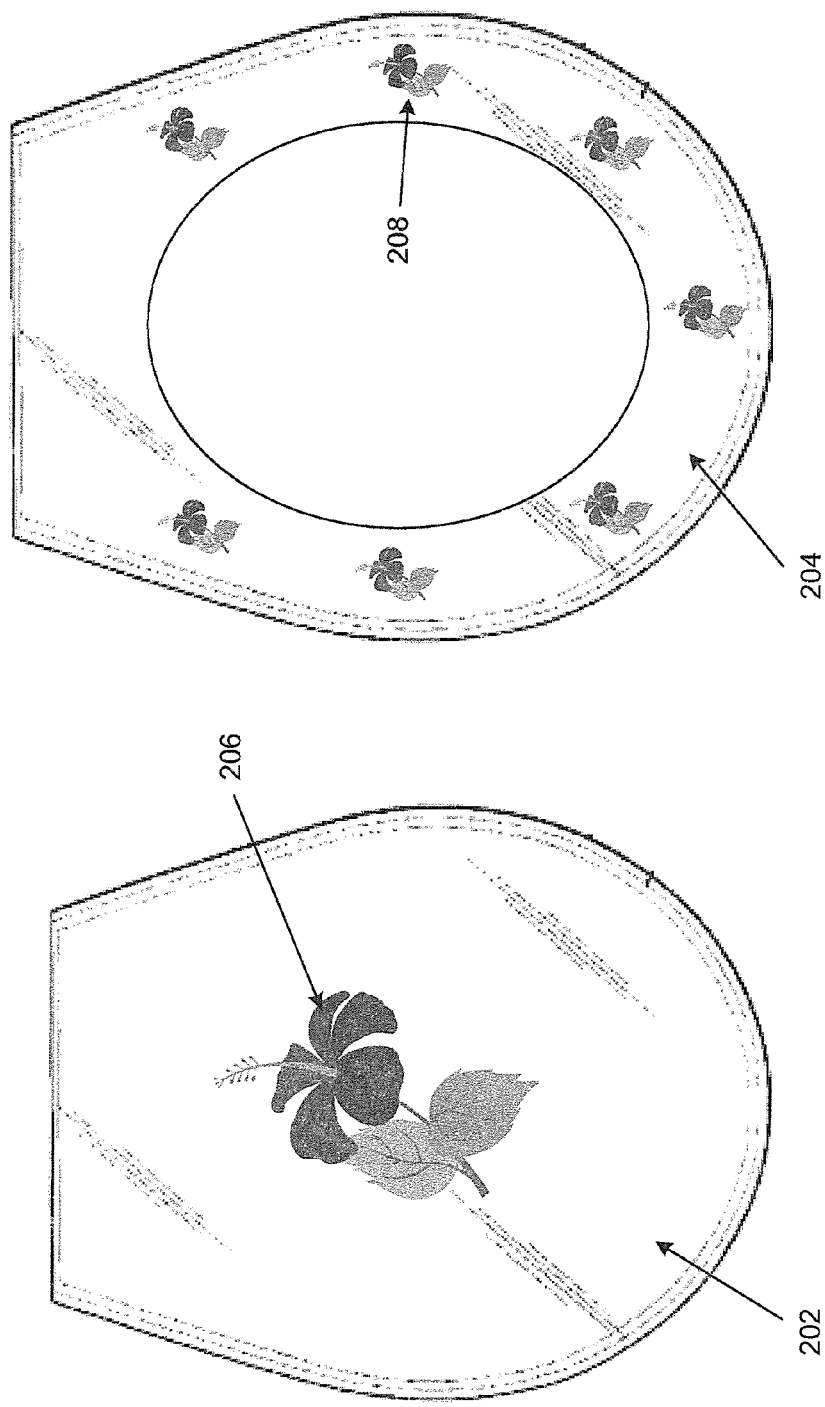
FIG. 2 illustrates top plan views of a laminar composite toilet lid and toilet seat, according to one embodiment of the present disclosure.

FIG. 2 illustrates top plan views of a laminar composite toilet lid and toilet seat, according to one embodiment of the present disclosure. The embodiment of the toilet lid 202 and toilet seat 204 shown in FIG. 2 is for illustration only. Other embodiments of the toilet lid 202 and seat 204 could be used without departing from the scope of this disclosure. For ease of explanation, the toilet lid 202 and toilet seat 204 may represent the toilet lid 102 and toilet seat 104 of FIG. 1. It will be understood, however, that the toilet lid 202 and toilet seat 204 may represent any other suitable toilet lid and toilet seat.

As shown in FIG. 2, the top surface of the toilet lid 202 includes a decorative graphic 206. Likewise, the top surface of the toilet seat 204 includes one or more decorative graphics 208. The decorative graphics 206, 208 may represent any picture, graphic, text, or other image, and are customizable to appeal to a user of a toilet where the toilet lid 202 and seat 204 are installed. In certain embodiments, the decorative graphics 206, 208 may be chosen to match or coordinate with a particular decorative scheme of a bathroom or restroom where the toilet is installed. In other embodiments, the decorative graphics 206, 208 may be chosen to display or feature a logo or trademark of a business. In still other embodiments, the decorative graphics 206, 208 may be chosen to display or feature a picture or design that reflects an interest or hobby of a homeowner. The decorative graphics 206, 208 are integrated into the laminar composition of the toilet lid 202 and toilet seat 204, as explained in greater detail below. Thus, the decorative graphics 206, 208 are protected from degradation and wear.

Although FIG. 2 depicts one example of a toilet lid 202 and toilet seat 204, various changes may be made to FIG. 2. For example, while the toilet lid 202 and toilet seat 204 are both shown with decorative graphics, in other embodiments, only one of the toilet lid 202 and toilet seat 204 may include a graphic. As another example, while only the top surfaces of the toilet 202 and toilet seat 204 are shown with a decorative graphic, the bottom surfaces of the toilet lid 202 and/or toilet seat 204 may also include a decorative graphic. As yet another example, while the decorative graphics 206, 208 are depicted as having the same image, in other embodiments, the decorative graphics 206, 208 could include different images or coordinating images.

Figure 3:
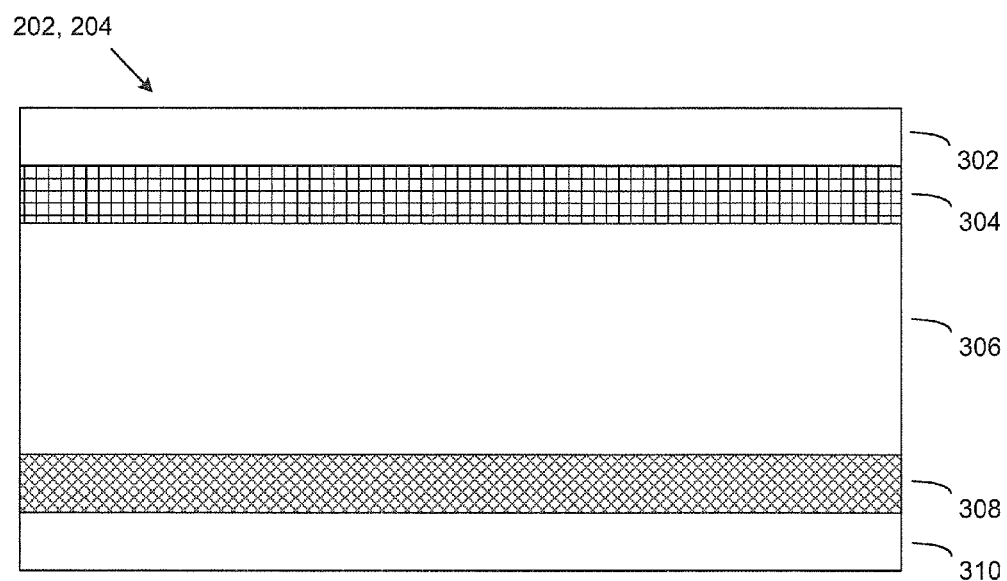
FIG. 3 illustrates a cross-section view of a laminar composite toilet lid and toilet seat, according to one embodiment of the present disclosure.

FIG. 3 illustrates a cross-section view of either the laminar composite toilet lid 202 or the toilet seat 204, according to one embodiment of the present disclosure. The embodiment of the toilet lid 202 or toilet seat 204 shown in FIG. 3 is for illustration only. Other embodiments of the toilet lid 202 or toilet seat 204 could be used without departing from the scope of this disclosure. For ease of explanation, the following disclosure will refer only to the toilet lid 202. However, it will be understood that the embodiments described below are also applicable to the toilet seat 204.

The toilet lid 202 comprises five layers 302-310. For clarity of illustration, the thickness of each layer 302-310 may not be drawn to scale. Layer 302 is an exterior finish or coating layer. Layer 304 is decorative graphic layer. Layer 306 is a core structural layer. Layer 308 is a second decorative layer. In certain embodiments, the layer 308 may be composed of the same material as the layer 304. In other embodiments, the layer 308 may be composed of a different material than layer 304. Layer 310 is a second exterior finish or coating layer.

In accordance with the present disclosure, the exterior finish layers 302, 310 may be formed of polymethyl-methacrylate (PMMA). PMMA is a transparent, thermoplastic material that is very durable and exhibits excellent optical properties. PMMA is also scratch resistant, can be CNC (computer numerical control) machined, and is more impact resistant than ordinary glass. PMMA is also known by its trade names Plexiglas™ and Lucite. The thickness of each finish layer 302, 310 may be selected according to the requirements of the application. In one embodiment, the thickness of each finish layer 302, 310 is approximately two millimeters (2 mm). While the exterior finish layers 302, 310 are described as PMMA, the layers 302, 310 may be formed of another special function glass or any other suitable material that exhibits the advantageous properties of PMMA.

In some embodiments, each exterior finish layer 302, 310 is clear and colorless. However, the exterior finish layers 302, 310 are not limited thereto. For example, either one or both of the exterior finish layers 302, 310 may be colored, tinted and/or mirrored. Either one or both of the exterior finish layers 302, 310 may be smooth or textured, and have a glossy or matte finish.

The core layer 306 may be formed of a medium density fiberboard (MDF). As is known in the art, MDF is formed of wood fibers that are held together with one or more waxes or resins such as epoxies, formaldehyde resins, or phenolic resins. The fiber content and thickness of the MDF core layer 306 may vary based on application requirements. The core layer 306 accounts for the majority of the thickness of the toilet lid 202 and provides most of the rigidity of the toilet lid 202. In one embodiment, the thickness of the core layer 306 is approximately nine millimeters (9 mm). In an embodiment, one or both sides of the core layer 306 are painted to hide or protect the finish of the MDF material.

Although the core layer 306 is described as being formed of MDF, other materials may be used. For example, the core layer 306 may be formed of another composite wood, such as hardwood plywood (HWPW), particleboard (PB), high density fiber board (HDF), molded wood, or any other suitable material. In an embodiment, the core layer 306 may be formed of two or more sub-layers, each sub-layer comprising one of the materials described above.

Each of the decorative graphic layers 304, 308 is formed of a paper or thin plastic material or film onto which an image has been printed, painted, or otherwise formed. Each decorative graphic layer 304, 308 may be sized to cover all, or only a portion, of a surface of the toilet lid 202. In an embodiment, each decorative graphic layer 304, 308 may be completely opaque, thus hiding the underlying surface of the toilet lid 202. In another embodiment, each decorative graphic layer 304, 308, or some portion thereof, may be partially or completely transparent, thus exposing at least part of the underlying surface of the toilet lid 202.

Although the decorative graphic layers 304, 308 have been described as including a particular image, the decorative graphic layers 304, 308 are not limited thereto. For example, in lieu of a displaying a decorative or graphic image, one or both layers 304, 308 may be a plain colored paper or film in any suitable color. Thus, a solid white paper could be used to make a white toilet seats. A solid blue paper could be used to make a blue toilet seat.

Although FIG. 3 depicts one example of a laminar composite toilet lid 202, various changes may be made to FIG. 3. For example, while shown composed of five layers, the laminar composite toilet lid 202 may include more or fewer than five layers. Layers 302-310 shown in FIG. 3 may be removed, repeated, or arranged in a different order. As a particular example, when one or both exterior finish layers 302, 310 are not clear, the adjacent decorative graphic layer 304, 308 may not be visible and may be removed. Each layer 302-310 may be thicker or thinner than depicted in FIG. 3. Each layer 302-310 may include one or more sub-layers. Other layers, composed of the same or different materials, may be added to the laminar composite toilet lid 202.

Figure 4:
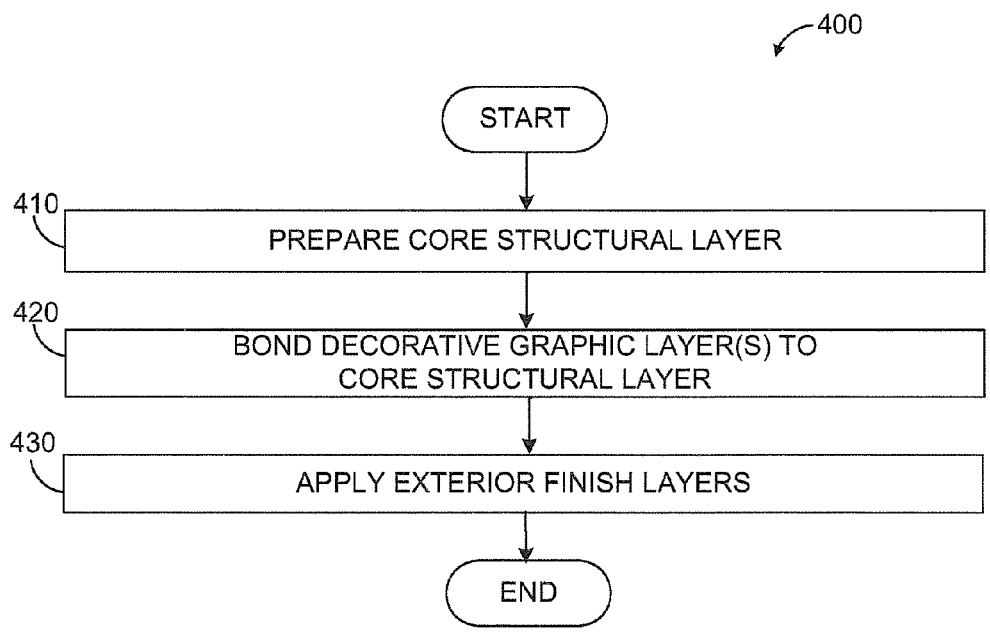
FIG. 4 depicts method for manufacturing a laminar composite toilet lid and seat, according to one embodiment of the present disclosure.

FIG. 4 depicts a method for manufacturing a laminar composite toilet lid and seat (e.g., toilet lid 202 and toilet seat 204), according one embodiment of the present disclosure. The method shown in FIG. 4 is for illustration only. Other embodiments of the method could be used without departing from the scope of this disclosure.

First, a core structural layer (e.g., layer 306) is prepared having a size and shape suitable for its application (step 410).

Preparation of the core structural layer may include painting one or more surfaces of the core structural layer. Next, a decorative graphic layer (e.g., layers 304, 308) is bonded to the top side, bottom side, or both top and bottom sides of the core structural layer (step 420). Each decorative graphic layer is bonded to the core structural layer using an adhesive or heat bonding process. If an adhesive is used, the adhesive may be sprayed on, brushed on, or applied in any other suitable manner.

Next, exterior finish layers (e.g., layers 302, 310) are applied to the externally visible surfaces of the core structural layer and decorative graphic layers (step 430). The exterior finish layers may be configured to come together along one or more edges, thus forming one or more seams. The seams may be finished according to known techniques in order to create a smooth transition. Once the exterior finish layers are completely applied, the exterior finish layers envelop the toilet lid or seat and provide a protective layer that resists wear and damage, but allows the decorative image or images to be seen.

Although FIG. 4 illustrates one example of a method for manufacturing a laminar composite toilet lid and seat, various changes may be made to FIG. 4. For example, while shown as a series of steps, various steps in FIG. 4 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A toilet lid assembly, comprising:
   a toilet lid; and
   a toilet seat connected to the toilet lid by hinged hardware, wherein the toilet lid comprises:
      a core structural layer having a shape and size associated with the toilet lid, the core structural layer having a plurality of painted surfaces;
      a first decorative graphic layer disposed on a first surface of the core structural layer;
      a second decorative graphic layer disposed on a second surface of the core structural layer opposite the first decorative graphic layer; and
      a plurality of exterior layers disposed on exterior surfaces of the core structural layer and the first and second decorative graphic layers,
      wherein at least a portion of each of the first and second decorative graphic layers is transparent and arranged to allow a portion of the painted surfaces of the core structural layer to be visible through the transparent portion.

2. The toilet lid assembly of claim 1, wherein the exterior layers together envelop the toilet lid.

3. The toilet lid assembly of claim 1, wherein the core layer comprises medium density fiberboard (MDF).

4. The toilet lid assembly of claim 1, wherein each exterior layer comprises polymethyl-methacrylate (PMMA).

5. The toilet lid assembly of claim 1, wherein the first decorative graphic layer comprises a plastic film comprising at least one image.

6. The toilet lid assembly of claim 1, wherein the first decorative graphic layer is bonded to the core structural layer using a liquid adhesive.

7. The toilet lid assembly of claim 1, wherein the second decorative graphic layer comprises a plastic film comprising at least one image that is different from the at least one image of the first decorative graphic layer.

8. A toilet lid, comprising:
   a core structural layer having a shape and size associated with the toilet lid, the core structural layer having a plurality of painted surfaces;
   a first decorative graphic layer disposed on a first surface of the core structural layer;
   a second decorative graphic layer disposed on a second surface of the core structural layer opposite the first decorative graphic layer; and
   a plurality of exterior layers disposed on exterior surfaces of the core structural layer and the first and second decorative graphic layers, the exterior layers configured to envelop the toilet lid,
   wherein at least a portion of each of the first and second decorative graphic layers is transparent and arranged to allow a portion of the painted surfaces of the core structural layer to be visible through the transparent portion.

9. The toilet lid of claim 8, wherein the exterior layers meet together to form a smooth seam.

10. The toilet lid of claim 8, wherein the core layer comprises medium density fiberboard (MDF).

11. The toilet lid of claim 8, wherein each exterior layer comprises polymethyl-methacrylate (PMMA).

12. The toilet lid of claim 8, wherein the first decorative graphic layer comprises a plastic film comprising at least one image.

13. The toilet lid of claim 8, wherein the first decorative graphic layer is bonded to the core structural layer using a liquid adhesive.

14. The toilet lid of claim 8, wherein the first decorative graphic layer is disposed on a top surface of the core structural layer.

15. A method of manufacturing a toilet lid, the method comprising:
   preparing a core structural layer of the toilet lid;
   painting all surfaces of the core structural layer;
   applying a first decorative graphic layer to a first surface of the core structural layer;
   applying a second decorative graphic layer to a second surface of the core structural layer opposite the first decorative graphic layer; and
   applying a plurality of exterior layers to exterior surfaces of the core structural layer and the first and second decorative graphic layers,
   wherein at least a portion of each of the first and second decorative graphic layers is transparent and arranged to allow a portion of the painted surfaces of the core structural layer to be visible through the transparent portion.

16. The method of claim 15, wherein the exterior layers are applied such that the exterior layers together envelop the toilet lid.

17. The method of claim 15, wherein the core layer comprises medium density fiberboard (MDF).

18. The method of claim 15, wherein each exterior layer comprises polymethyl-methacrylate (PMMA).

19. The method of claim 15, wherein the first decorative graphic layer comprises a plastic film comprising at least one image.

20. The method of claim 15, wherein the first decorative graphic layer is bonded to the core structural layer using a liquid adhesive.

\* \* \* \* \*